3,314,901
PRODUCTION OF POLYURETHANE FOAMS
Guenther Daumiller, Ziegelhausen, Hans Wilhelm, Ludwigshafen (Rhine), and Eberhard Wegner, Frankenthal, Pfalz, Germany, assignors to Badisch Anilin- & Soda-Fabrik Aktiengesellschaft, Ludwigshafen (Rhine), Germany
No Drawing. Filed July 3, 1963, Ser. No. 293,237
Claims priority, application Germany, July 5, 1962, B 67,923
7 Claims. (Cl. 260—2.5)

This invention relates to a process for the production of polyurethane foams. It is known that foam materials containing urethane groups can be prepared by reaction of polyhydroxy compounds with polyisocyanates and water. Polyesters prepared from polyfunctional alcohols and polybasic carboxylic acids, or the polyethers obtained by polymerization of cyclic ethers and particularly of alkylene oxides, have in general been used as the polyhydroxy compounds for the said purpose. When preparing polyurethane foam material from polyethers, these are usually first reacted with the polyisocyanates to form preliminary adducts which then are expanded with water in a further reaction. Since the said preliminary adducts expand even under the action of atmospheric humidity, they must either be used immediately after they have been made or must be kept out of contact with humidity until they are used. This method is troublesome and expensive. It is also known to catalyze by basic substances, particularly tertiary amines, the reaction of isocyanates with compounds containing reactive hydrogen atoms. Such amines have an unpleasant odor and in some cases are highly toxic. The use of these compounds as catalysts for the production of foam materials from polyisocyanates and polyhydroxy compounds therefore requires special precautions.

Polyethers which have been obtained by addition of alkylene oxides to polyfunctional primary and secondary amines have also already been reacted with polyisocyanates and expanded with water. A disadvantage of this is that the expanded material thus obtained cures slowly and is not satisfactory in its mechanical properties.

It is an object of the present invention to provide a process for the manufacture of polyurethane foams which does not have the disadvantages of the prior art processes. Another object of the invention is polyurethane foams which are odorless and free from toxic substances. Other objects and advantages of the invention will be apparent from the following detailed description of our invention.

These objects and advantages are achieved in the reaction of polyesters and/or polyethers containing free hydroxyl groups with polyisocyanates in the presence of water, or readily volatile organic compounds, by carrying out the reaction in the presence of copolymers containing groups which will react with isocyanates and also containing tertiary nitrogen atoms and which have been obtained from monomeric polymerizable α,β-ethylenically unsaturated compounds.

Polyesters having free hydroxyl groups are condensation products of polycarboxylic acids with polyalcohols. Suitable polycarboxylic acids are for example adipic acid, sebacic acid, phthalic acid, isophthalic acid, terephthalic acid, oxalic acid, succinic acid, malonic acid, cyclohexane-1,2-dicarboxylic acid and cyclohexane-1,4-dicarboxylic acid. Examples of suitable polyalcohols for the production of the polyesters are: ethylene glycol, diethylene glycol, propylene glycol, butylene glycol-1,2, butylene glycol-2,3, butylene glycol-1,4, glycerin, trimethylolpropane, trimethylolethane, hexanediol, and also amino alcohols, such as diethanolamine and triethanolamine. Generally the polyesters have molecular weights between 800 and 8000. Polyesters having a melting point below 20° C. are particularly suitable.

Linear and branched polyethers having at least two free hydroxyl groups are also suitable for the process. Preferred polyethers are polyalkylene glycol ethers, particularly polypropylene glycol ethers. The molecular weight of the polyethers should be at least 250 and may be up to 10,000. For the production of soft foam material it is preferred to use polyethers having molecular weights of 1500 to 4500, and for the production of rigid foam material it is preferred to use polyethers having molecular weights of up to 1500.

The polyethers may be obtained by polymerization of alkylene oxides, such as ethylene oxide, propylene oxide, 1,2-butylene oxide, 2,3-butylene oxide or styrene oxide, or by adding on these alkylene oxides to dihydric or higher polyhydric alcohols or phenols, such as ethylene glycol, 1,2-propylene glycol, 1,3-propylene glycol, butylene glycol-(1,3), butylene glycol-(2,3), glycerin, 1,2,6-hexanetriol, trimethylolpropane, pentaerythritol, hydroquinone, 4,4'-dihydroxydiphenylmethane or 4,4'-dihydroxydicyclohexylmethane, dihydroxynaphthalene, or to ammonia or primary or secondary amines. The adducts of propylene oxide to 2-, 3- and 4-hydric alcohols are particularly suitable. Obviously it is also possible to obtain suitable polyethers by reacting compounds containing hydroxyl groups of the said kind with mixtures of alkylene oxides or by copolymerization of alkylene oxides.

Suitable copolymers containing groups which will react with isocyanates and containing tertiary nitrogen atoms may contain monomeric polymerizable α,β-ethylenically unsaturated compounds having tertiary nitrogen atoms and also monomeric α,β-ethylenically unsaturated compounds containing groups which will react with isocyanates, and if desired other monomers in polymerized form. Copolymers which contain monomeric α,β-ethylenically unsaturated polymerizable compounds containing both a tertiary basic nitrogen atom and also a group which will react with isocyanate, and other α,β-ethylenically unsaturated polymerizable compounds in polymerized form are also suitable. The copolymers contain at least 2 groups which will react with isocyanates. Hydroxyl groups are preferred groups which will react with isocyanates. Copolymers which contain carboxylic groups, carboxylic amide groups, the sulfur-containing analogs, sulfhydryl groups, primary and secondary basic amino groups and also activated hydrogen atoms attached to carbon atoms are also suitable.

Examples of monomeric polymerizable α,β-ethylenically unsaturated compounds having tertiary nitrogen atoms are vinylpyridines, such as 2-vinylpyridine, 5-methyl-2-vinylpyridine, 4-vinylquinoline, 3-vinylisoquinolines, vinylacridines, vinylpyrimidines, vinylindazoles, N-vinylimidazoles, such as N-vinylimidazole, N-vinyl-2-methylimidazole, N-vinyl-2,4,6-trimethylimidazole, N-vinylbenzimidazoles and N-vinylpyrazoles, such as N-vinyl-3,5-dimethylpyrazole.

Examples of other suitable monomeric polymerizable α,β-ethylenically unsaturated compounds having tertiary nitrogen atoms are substituted polymerizable carboxylic amides and esters, such as those derived from acrylic acid, methacrylic acid or chloracrylic acid having the general formula:

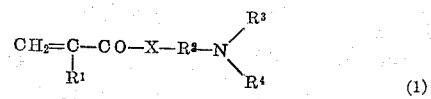

(1)

in which X denotes NH or oxygen, $R^1$ denotes hydrogen or alkyl, $R^2$ denotes an aliphatic alkylene radical, such as methylene, ethylene or butylene, which may also be branched, $R_3$ denotes an unsubstituted linear or branched alkyl, aryl or aralkyl radical and $R^4$ denotes an unsubituted or substituted linear or branched alkyl, aryl or aralkyl radical.

The dimethylaminoethyl esters of methacrylic acid or acrylic acid are examples of particularly suitable compounds of this type. Substituted derivatives of the amides and esters of polymerizable dicarboxylic acids, for example of maleic acid, fumaric acid or itaconic acid, corresponding to the above formula are also suitable.

Dialkylamino-substituted aromatic compounds derived from styrene or its homologs and having the general formula:

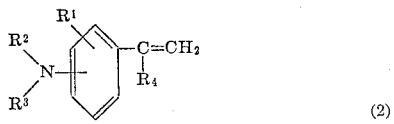

in which $R^1$ denotes a hydrogen atom or an alkyl, aryl or aralkyl group, $R^2$ denotes an alkyl, aryl or aralkyl radical, $R^3$ denotes an alkyl, aryl or aralkyl radical, $R^4$ denotes a hydrogen atom or an alkyl, aryl or aralkyl radical, and the group

may occur more than once in the molecule. The aromatic nucleus may also be partly or wholly hydrogenated and may be present more than once in the molecule. For example m-dimethylaminostyrene is a particularly suitable compound.

Examples of monomeric polymerizable $\alpha,\beta$-ethylenically unsaturated compounds which contain not only tertiary nitrogen atoms but also groups which will react with isocyanates are hydroxylated and hydroxyalkylated vinylpyridines, such as 2-hydroxyethyl-5-vinylpyridine, and also hydroxylated and hydroxyalkylated vinylquinolines, vinylisoquinolines, vinylacridines, vinylpyrimidines, vinylimidazoles, vinylimidazoles, vinylpyrazoles, vinyltriazoles, hydroxylated and hydroxyalkylated vinylbenzoxazoles or vinyloxazoles.

Compounds of this group which are particularly preferred are N-vinylimidazoles which contain a hydroxyl group, such as N-vinyl-2-hydroxymethylimidazole, N-vinyl-2-methyl-4-($\beta$-hydroxyethyl)-imidazole, N-vinyl-2-hydroxyethylimidazole and N-vinyl-2-hydroxymethyl-4,5-benzimidazole. Substituted polymerizable carboxylic amides and esters of the above general Formula 1 in which $R^1$, $R^3$ and $R^4$ are hydroxyalkyl radicals and the aliphatic alkylene radical $R^2$ may be hydroxyalkylated are also suitable. At least one of the radicals $R^2$, $R^3$ and $R^4$ should bear a hydroxyl group, advantageously in $\beta$-position to the nitrogen atom. This requirement may be dispensed with if $R^1$ in the above general Formula 1 is a hydroxyalkyl group as in amides based on $\alpha$-hydroxymethacrylic acid. A compound of this group which is specially preferred is di-($\beta$-hydroxyethyl)-aminomethyl-methacrylamide.

Further suitable compounds are dialkylamino-substituted, hydroxy - substituted or hydroxyalkyl - substituted aromatic compounds having the general Formula 2 in which at least one of the alkyl, aryl or aralkyl radicals $R^2$, $R^3$ and $R^4$ contains a hydroxyl group. $R^1$ may also be a hydroxyl group. When $R^4$ contains a hydroxyl radical, $R^1$, $R^2$ and $R^3$ may be radicals free from hydroxyl groups; in this case also however the hydroxyl group may occur more than once.

Examples of suitable monomeric polymerizable $\alpha,\beta$-ethylenically unsaturated compounds containing groups which will react with isocyanate are alcohols containing ethylenically unsaturated double linkages, such as allyl alcohol, methallyl alcohol, butene-2-ol-(1), 2-methylbutene-(3)-ol-(2) or cinnamic alcohol, and also the partial esters of unsaturated monocarboxylic and dicarboxylic acids with polyfunctional alcohols. Monoesters of acrylic or methacrylic acid with diols having two to six carbon atoms, such as 2-hydroxyethyl acrylate, 4-hydroxybutyl acrylate, 5-hydroxypentyl acrylate, 6-hydrohexyl acrylate, monoglycerin acrylate and diglycerin acrylate. Monoglycerin maleate and diglycerin maleate are also suitable. In some cases $\alpha,\beta$-unsaturated carboxylic acids and amides, such as acrylic acid, methacrylic acid, acrylamide or methacrylamide are also suitable.

Other monomeric polymerizable $\alpha,\beta$-ethylenically unsaturated compounds which are suitable for copolymerization with the above specified monomers for the production of the copolymers to be used according to this invention are esters of $\alpha,\beta$-ethylenically unsaturated carboxylic acids with alcohols having one to six carbon atoms, particularly esters of acrylic acid or methacrylic acid with these alcohols, for example methyl acrylate, ethyl acrylate, propyl acrylate, butyl acrylate, isobutyl acrylate, tertiary-butyl acrylate, hexyl acrylate, 2-ethylhexyl acrylate, methyl methacrylate or ethyl methacrylate. Maleic esters are also suitable, such as dibutyl maleate, fumaric esters, itaconic esters, and also vinyl esters of acids having one to four carbon atoms, such as vinyl acetate and vinyl propionate, vinyl halides, such as vinyl chloride, vinyl fluoride, vinylidene halides, such as vinylidene chloride, vinyl-aromatic compounds, such as styrene and its homologs, N-substituted and N-disubstituted carboxylic amides, such as N-butylacrylamide, N-methylolacrylamide, N-methylolmethacrylamide, N,N-dimethylacrylamide, acrylonitrile, and vinyl lactams, such as N-vinylpyrrolidone, N-vinylcaprolactam, vinyl ethers, such as vinyl isobutyl ether, unsaturated hydrocarbons and diene hydrocarbons and allyl compounds, such as diallyl phthalate.

Partly saponified polymerization products of monomeric compounds containing a group saponifiable to a hydroxyl group may also be used; examples of these are partly saponified copolymers of vinyl esters, for example partly saponified vinyl acetate polymers or vinyl propionate polymers. Polymers containing ester groups which have been partly transesterified with polyhydric alcohols may also be used.

Conventional methods may be used for the preparation of these copolymers, such as polymerization in bulk, solution or suspension, and the conventional catalysts may be used. Obviously the copolymers may contain in admixture one or more of the said monomers from the said classes. In this way and also by mixing these polymers with other vinyl polymers which do not contain the said compounds, it is possible to obtain foam materials having different mechanical and chemical properties.

The K-values of the copolymers to be used according to the invention should not be above 50 and are advantageously below 20. The proportion in the copolymers of the tertiary nitrogen atoms which catalyze the reaction with isocyanates may be varied within wide limits. The pot life of the mixtures and the subsequent properties of the foam material may thus be varied by the content of basic nitrogen atoms in the copolymer.

Similarly, in the copolymers the number of groups which will react with isocyanate may be varied at will. When the groups in the polymer which will react with isocyanate are hydroxyl groups, polymers for hard and rigid foam material should have hydroxyl numbers of 125 to 300 and higher, and for soft and elastic foam material they should have hydroxyl numbers of less than 125, advantageously in the range of 20 to 90.

We understand polyisocyanates as being compounds having at least two —NCO groups in the molecule. Of the polyisocyanates, aromatic diisocyanates are particularly suitable, such as 2,4-toluylene diisocyanate and 2,6-toluylene diisocyanate, and also any mixtures of these two compounds, di-p-xylylenemethane diisocyanate, diphenylmethane-4,4-diisocyanate, and also polyphenylpolymethylene isocyanates having the general formula:

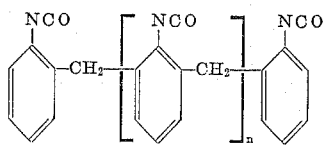

in which $n$ is 1, 2 or 3. Hexamethylene diisocyanate, naphthylene-1,5-diisocyanate and also triisocyanates, such as triphenylmethane-4,4',4''-triisocyanate, are also suitable. Mixtures of polyisocyanates may also be used.

The mixtures of polyesters and/or polyethers and copolymers should advantageously contain between 5 and 75% by weight of the copolymer with reference to the mixture. It is particularly advantageous to work with mixtures which contain 5 to 25% by weight of the copolymer. With reference to the mixture of polyester and/or polyether and copolymer, the proportion of the compound having a tertiary nitrogen atom to catalyze the reaction with isocyanates should be between 0.25 and 10% by weight.

In the preparation of the foam material it is advantageous first to mix the polyester and/or the polyether with the copolymer and then to add polyisocyanate and water or a readily volatile organic compound as expanding agent. Mixing of the polyester and/or polyether with the copolymer is advantageously carried out in a kneader. The polymers may also be mixed in solution and the solvent evaporated.

The mixture of polyester and/or polyether, copolymer and polyisocyanate may be expanded for example by means of water. In this case 0.5 to 10% by weight, advantageously 1 to 5% by weight, of water with reference to the amount of the mixture of polyester, polyether and copolymer is added to the mixture.

The mixtures may also be expanded by introduction of readily volatile organic compounds which are indifferent to isocyanate and whose boiling points are between 0° and 100° C. Examples of such compounds are aliphatic or cycloaliphatic hydrocarbons, such as butane, pentane, hexane, cyclohexane or chlorinated hydrocarbons having one to three carbon atoms, such as methyl chloride, dichloroethane or fluorochlorohydrocarbons having one to three carbon atoms, such as dichlorodifluoromethane, monochlorotrifluoromethane, 1,2,2-trifluoro-1,1,2-trichloroethane. Among these compounds, fluorochlorohydrocarbons have a particular importance. These compounds are used in amounts of 1 to 50%, preferably 5 to 30%, by weight with reference to the mixture of polyester and/or polyether and copolymer.

The mixture of polyester or polyether and copolymer is reacted with such an amount of polyisocyanate that 0.8 to 1.5, preferably 1 to 1.1, isocyanate groups are contained for each group which will react with isocyanate. By groups which will react with isocyanate we mean the sum of the free hydroxyl groups contained in the polyester or polyether and the groups which will react with isocyanate contained in the copolymer.

If the mixture is expanded with water, it is necessary that there should also be 0.8 to 1.5, preferably 1 to 1.1 isocyanate groups in the mixture for each molecule of water.

Reaction of the components may if desired be accelerated by moderate heating, but this measure is usually unnecessary because the copolymers containing tertiary basic nitrogen atoms catalyze the reaction of the polyesters or polyethers with the polyisocyanates very actively. These mixtures to be used according to this invention may also contain mixtures of a plurality of polyesters and/or polyethers and a plurality of copolymers. Other compounds which will react with isocyanates, such as reactive copolymers, may also be contained in the mixtures.

For the uniform distribution of the water, it is advantageous also to add a small amount of an emulsifier and also if desired an auxiliary for regulating the size and distribution of the pores. Examples of such auxiliaries are water-soluble organopolysiloxanes and an adduct of 16 to 20 moles of propylene oxide to 1 mole of dimethylsiloxane. It is also possible to use additionally tertiary amines or organometallic compounds, such as dibutyl tin diethyl hexoate, metal alcoholates or metal salts, such as tin octoate, as catalysts.

Mixing of the components should take place as quickly and uniformly as possible between 5° and 100° C., preferably between 10° and 50° C., and the sequence in which the additions are made may be varied at will. Thus it is possible for example first to add water and auxiliaries to the polyesters and/or polyethers, then to mix them with the copolymer and thereafter to effect reaction with polyisocyanate with expansion. Expansion occurs soon after mixing and is completed within a few seconds to a few minutes.

A particular advantage of the process resides in the fact that the conventional production of the so-called preliminary adducts from the polyesters and/or polyethers and polyisocyanate may be dispensed with if copolymers containing groups which will react with isocyanates and tertiary nitrogen atoms are coemployed. It is also unnecessary to add low molecular weight catalysts for the polyurethane condensation. In this way the production of the expandable mixture becomes simpler and handling of odoriferous or toxic amines is avoided. It is also an advantage that the catalytic copolymer remains a constituent of the expanded shaped article after crosslinking via the groups which will react with isocyanates.

Expanded material prepared according to this invention is distinguished by high resistance to water and ageing and low sensitivity to light and humidity. Soft expanded material has good properties as regards tensile strength, elasticity and resistance to ecompression.

The expanded plastics are suitable as insulating material against heat and sound and also for the production of packaging material, upholstery material and display material.

In the following examples which illustrate the invention, K-values are determined by the method of H. Fikentscher (Cellulosechemie 13 (1932), 60). Hydroxyl numbers are defined by the amount of potassium hydroxide in milligrams which is necessary to saponify acetate formed from 1 g. of polyester or polyether. The parts mentioned in the examples are parts by weight.

EXAMPLE 1

865 parts of isobutyl acrylate, 60 parts of 4-hydroxybutyl acrylate, 75 parts of tertiary dodecylmercaptan, 75 parts of N-vinylimidazole and 1.25 parts of azodiisobutyronitrile are first heated to 55° C. while passing nitrogen in and stirring vigorously. 4.5 hours later, another 1.25 parts of azodiisobutyronitrile is added and the mixture is kept at 80° to 90° C. for another four hours. A copolymer is obtained which has a K-value of 26 (measured at 2% in dimethylformamide) and the hydroxyl number 26.

100 parts of polypropylene glycol having a molecular weight of 2000 and a hydroxyl number of 56 is mixed with 11 parts of the said copolymer, 1.5 parts of a water-soluble organopolysiloxane and 3.3 parts of water. Then 33 parts of a mixture of isomers of 2,4- and 2,6-toluylene diisocyanate as added with intense stirring. The mixture foams up after about 30 seconds and the expansion is completed within about three to four minutes. The whole is then heated for two hours at 80° to 90° C. An elastic expanded material having a density of 0.06 g./cc. is obtained.

EXAMPLE 2

865 parts of isobutyl acrylate, 120 parts of 4-hydroxybutyl acrylate, 15 parts of N-vinylimidazole, 80 parts of tertiary dodecylmercaptan and 1.25 parts of azodiisobutyronitrile are first heated for 4.5 hours at 50° to 75° C. while stirring and passing in nitrogen and then heated for nother four hours at 85° to 90° C. after another 1.25 parts of azodiisobutyronitrile has been added. A copolymer is obtained having a K-value of 13.0 (measured at 2% in dimethylformamide) and a hydroxyl number of 44.

75 parts of polypropylene glycol (molecular weight 800 and hydroxyl number 59) is mixed with 82.5 parts of the said copolymer, 1.0 part of a water-soluble organopolysiloxane and 4 parts of water. Then 26 parts of a mixture of isomers of 2,4- and 2,6-toluylene diisocyanate is added while stirring. The mixture expands after a few seconds. After fifteen minutes, a very elastic expanded material is obtained which has uniform fine pores and is not sticky. Its density is 0.05 g./cc.

EXAMPLE 3

1680 parts of isobutyl acrylate, 280 parts of 4-hydroxybutyl acrylate, 40 parts of N-vinyl-2-methylolimidazole and 150 parts of tertiary dodecylmercaptan and 2.5 parts of azodiisobutyronitrile are heated for four hours at 60° to 80° C. while stirring and passing in nitrogen and then, after another 2.5 parts of azodiisobutyronitrile has been added, heated for another three and one half hours at 80° to 90° C. A copolymer is obtained having a K-value of 13.0 (measured at 2% in dimethylformamide) and a hydroxyl number of 55.

100 parts of polypropylene glycol having a molecular weight of 2000 and a hydroxyl number of 56 is mixed with 30 parts of the said copolymer, 1 part of polyvinyl alcohol having a K-value of 20, and 4 parts of water. 32 parts of a mixture of isomers of 2,4- and 2,6-toluylene diisocyanate is then added with intense stirring. The mixture foams up after about fifteen to twenty seconds and the expansion process is ended after five minutes. An expanded material is obtained having a density of 0.055 g./cc. and having uniform fine pores, high elasticity and tensile strength.

EXAMPLE 4

100 parts of a propylene glycol having a molecular weight of 1800 and a hydroxyl number of 58 is first mixed at room temperature with 29 parts of a mixture of isomers of 2,4- and 2,6-toluylene diisocyanate. Then while stirring vigorously, 44 parts of the copolymer prepared as described in Example 1, 1.5 parts of a water-soluble organopolysiloxane and another 6 parts of a mixture of isomers of 2,4- and 2,6-toluylene diisocyanate are added. The mixture begins to foam up after 6 parts of water has been added. The expanded material is free from tackiness after twenty minutes. It has a density of 0.05 g./cc., uniform and fine pores and an excellent elasticity and tensile strength.

EXAMPLE 5

850 parts of butyl acrylate, 120 parts of 4-hydroxybutyl acrylate and 30 parts of m-dimethylaminostyrene are heated for three hours at 60° to 70° C. with 60 parts of tertiary doedcylmercaptan under nitrogen in the presence of 1.25 parts of azodiisobutyronitrile. Then another 1.25 parts of azodiisobutyronitrile is added and the whole heated for another three hours at 80° to 90° C. A clear copolymer is obtained in a yield of 94.5%. It has a K-value of 11.5 (measured at 2% in dimethylformamide) and a hydroxyl number of 47.

50 parts of this copolymer is thoroughly mixed with 50 parts of a propylene glycol having a molecular weight of 2000 and a hydroxyl number of 55, 1.5 parts of a water-soluble organopolysiloxane and 3 parts of water. Then, while stirring intensely, 18.5 parts of a mixture of 2,4- and 2,6-toluylene diisocyanate is added. The mixture foams up immediately and is cured within eight to ten minutes. The expanded material has a density of 0.065 g./cc., good elasticity and compressive hardness.

EXAMPLE 6

430 parts of butyl acrylate, 50 parts of 4-hydroxybutyl acrylate and 20 parts of N-vinylimidazole are dissolved with 17.5 parts of butene-2-ol-(1) in 500 parts of benzene and heated under nitrogen for four hours at 60° to 70° C. in the presence of 0.5 part of azodiisobutyronitrile. Another 0.5 part of azodiisobutyronitrile is then added and the whole heated for another three hours at 75° to 85° C. A 50% polymer solution is obtained. The polymer has a K-value of 41.5 (measured at 2% in dimethylformamide) and a hydroxyl number of 31.

50 parts of the copolymer solution is mixed with 150 parts of a polyether (prepared by adding on propylene oxide to neopentyl glycol and having a molecular weight of 3800 and a hydroxyl number of 49) and 25 parts of a polyether (prepared by adding on propylene oxide to pentaerythritol and having a molecular weight of 3200 and a hydroxyl number of 40) and freed from solvent in vacuo at 140° C. Then 2.5 parts of a water-soluble organopolysiloxane and 4.5 parts of water are added and finally 60 parts of a mixture of 2,4- and 2,6-toluylene diisocyanate is added with good stirring. The mixture foams up after fifteen to twenty seconds and is cured after about five minutes. The expanded material has very high elasticity. It has a density of 0.042 g./cc. The compression set according to DIN 53,572 is less than 2%. Water absorption is very low.

EXAMPLE 7

415 parts of butyl acrylate, 62.5 parts of 4-hydroxybutyl acrylate, 12.5 parts of N-vinyl-2,4,5-trimethylimidazole and 25 parts of tertiary dodecylmercaptan are heated under nitrogen for four hours at 60° to 70° C. in the presence of 1.25 parts of azodiisobutyronitrile. Another 1.25 parts of azodiisobutyronitrile is then added and heating continued for another four hours at 80° to 90° C. A clear, fairly viscous polymer is obtained in a yield of 96.1%. It has a K-value of 16.0 (measured at 2% in dimethylformamide) and a hydroxyl number of 48.

100 parts of this copolymer is thoroughly mixed with 100 parts of a polypropylene glycol having a molecular weight of 2000 and a hydroxyl value of 55, 100 parts of a polyether having a molecular weight of 3500 and a hydroxyl number of 55 (prepared by adding on propylene oxide to trimethylolpropane), 2.5 parts of a water-soluble organopolysiloxane and 7.5 parts of water. Then 111 parts of a mixture of 2,4- and 2,6-toluylene diisocyanate is added and the whole stirred intensely. The mixture begins to foam up after twenty-five seconds. The expansion process is over after three minutes. The expanded material has a density of 0.055 g./cc. and is very elastic and has high tensile strength.

EXAMPLE 8

820 parts of 2-ethylhexyl acrylate, 150 parts of 4-hydroxybutyl acrylate and 30 parts of vinylimidazole are dissolved with 35 parts of butenol in 1000 parts of ethyl acetate. 500 parts of this solution is heated under nitrogen for two hours at 60° to 70° C. in the presence of 1.0 part of azodiisobutyronitrile. The remaining 1500 parts of the solution is then allowed to drip in during the course of three hours, the temperature being kept at 70° to 75° C. Another 1.0 part of azodiisobutyronitrile is then added and the whole heated for two hours at 75° to 85° C. The 48% copolymer solution thus obtained has a K-value of 42.5 (measured at 2% in dimethylformamide) and a hydroxyl number of 45.

20 parts of the solvent-free copolymer is thoroughly mixed with 20 parts of a polypropylene glycol having a molecular weight of 2000 and a hydroxyl number of 55, 60 parts of an adduct of propylene oxide to pentaerythritol having a molecular weight of 3200 and a hydroxyl number of 40, 100 parts of a polyaddition product of propylene oxide to neopentyl glycol having a molecular weight of 3800 and a hydroxyl number of 49, 2.5 parts of a water-soluble organopolysiloxane, 0.5 part of stannous octoate and 4.5 parts of water. Then, while stirring intensely, 60 parts of a mixture of 2,4- and 2,6-toluylene diisocyanate is added. The mixture foams up at once and is cured after five to six minutes. The expanded material formed is extremely elastic and has a density of 0.045 g./cc.

An expanded material prepared from the same mixture but without the copolymer has not yet cured after twenty-four hours and is still tacky.

EXAMPLE 9

10 parts of the copolymer solution described in Example 8, 60 parts of a polypropylene glycol having a molecular weight of 2000 and a hydroxyl number of 50, 30 parts of a polyaddition product of propylene oxide to pentaerythritol having a molecular weight of 3200 and a hydroxyl number of 40 and also 50 parts of a polyaddition product of propylene oxide to trimethylolpropane having a molecular weight of 2300 and a hydroxyl value of 43 are mixed and freed from solvent in vacuo at 125° C. Then 1.5 parts of a water-soluble organopolysiloxane and 3.5 parts of water are added and, while stirring thoroughly, 50 parts of a mixture of 2,4- and 2,6-toluylene diisocyanate. The mixture foams up after 20 to 30 seconds and is cured in five to seven minutes. The expanded material has a density of 0.05 g./cc. and is very suitable for upholstery materials because of its good elasticity and resistance to compression.

If a polyaddition product of propylene oxide to ethylene diamine having a molecular weight of 2400 and a hydroxyl number of 52 be used instead of the copolymer and the polypropylene glycol, and otherwise the same mixture be used, the expanded material obtained is still tacky after six hours.

EXAMPLE 10

750 parts of isobutyl acrylate, 100 parts of 2-hydroxypropyl methacrylate and 150 parts of 2-methyl-5-vinylpyridine are heated with 75 parts of tertiary dodecyl mercaptan in the presence of 1.25 parts of azodiisobutyronitrile for three hours at 65° to 70° C. under nitrogen. Another 1.25 parts of azodiisobutyronitrile is then added and the whole heated for another three hours at 85° to 90° C. A clear almost colorless copolymer is obtained in a yield of 93.5%. It has a K-value of 13.5 (measured at 2% in dimethylformamide) and a hydroxyl number of 37.

50 parts of this copolymer is mixed thoroughly with 100 parts of an adipic acid ethylene glycol polyester having a molecular weight of 2000 and a hydroxyl number of 56, 1.0 part of a water-soluble organopolysiloxane, 2.5 parts of water and 27.5 parts of a mixture of 2,4- and 2,6-toluylene diisocyanate. The mixture begins to foam up after twenty seconds and the expansion process is completed after about three minutes. The expanded material has a density of 0.068 g./cc.

EXAMPLE 11

400 parts of butyl acrylate, 80 parts of 2-hydroxyethyl acrylate and 20 parts of N-vinylbenzimidazole are dissolved with 15 parts of butenol in 500 parts of ethyl acetate and heated under nitrogen for three hours at 65° to 70° C. in the presence of 0.5 part of azodiisobutyronitrile. Another 0.5 part of azodiisobutyronitrile is then added and heating continued for another three and a half hours at 80° to 90° C. A 49.5% clear polymer solution is obtained having a K-value of 38.5 (measured at 2% in dimethylformamide) and a hydroxyl number of 82.

100 parts of this polymer solution are mixed with 50 parts of a polypropylene glycol having a molecular weight of 2000 and a hydroxyl number of 56 and 100 parts of a polyaddition product of propylene oxide to glycerin having a molecular weight of 2,460 and a hydroxyl number of 47 and freed from solvent in vacuo at 125° to 135° C. 2.5 parts of a water-soluble organopolysiloxane, 1 part of stannous octoate and 4.5 parts of water are then added and, with good stirring, 67.5 parts of a mixture of 2,4- and 2,6-toluylene diisocyanate. The mixture foams up rapidly and the expansion process is over after two to three minutes. The expanded material has a density of 0.072 g./cc. The pores are fine and uniformly distributed.

EXAMPLE 12

225 parts of n-butyl acrylate, 25 parts of 2-hydroxyethyl-N-vinylimidazole and 7.5 parts of butene-2-ol-(1) are dissolved in 250 parts of benzene. While passing in nitrogen, the solution is heated for four hours at 60° to 75° C. in the presence of 0.25 part of azodiisobutyronitrile. Another 0.25 part of azodiisobutyronitrile is then added and heating continued for another three hours at 80° to 90° C. A colorless clear solution of a polymer having a K-value of 38.0 (measured at 2% in dimethylformamide) and a hydroxyl number of 41 is obtained.

400 parts of this polymer solution is mixed with 200 parts of polypropylene glycol having a molecular weight of 2000 and a hydroxyl number of 56 and 200 parts of an adduct of propylene oxide to trimethylolpropane having a molecular weight of 3500 and a hydroxyl number of 55, and freed from solvent in vacuo at 140° C.

Another 50 parts of polypropylene glycol having the hydroxyl number 56, 50 parts of the adduct of propylene oxide to trimethylolpropane having the hydroxyl number 55, 1.5 parts of a water-soluble organopolysiloxane and 4 parts of water are added to 50 parts of the mixture obtained in the preceding paragraph. 62 parts of a mixture of 2,4- and 2,6-toluylene diisocyanate are then added with intense stirring. The mixture foams up after about fifteen seconds and is cured after about twelve minutes. The expanded material obtained has a density of 0.048 g./cc.; it is extremely elastic and exhibits a compression set of less than 5% at room temperature and 12.5% at 70° C.

EXAMPLE 13

50 parts of 4-hydroxybutyl acrylate, 20 parts of N-vinyl-3,5-dimethylpyrazole, 215 parts of butyl acrylate and 215 parts of vinyl propionate are dissolved with 17.5 parts of butene-2-ol-(1) in 500 parts of benzene and heated under nitrogen at 70° to 75° C. in the presence of 0.5 part of azodiisobutyronitrile. Another 0.5 part of azodiisobutyronitrile is then added and heating continued for another eight hours at 75° to 85° C. An about 50% polymer solution is obtained. The polymer has a K-value of 38.0 (measured at 2% in dimethylformamide) and a hydroxyl number of 32.

100 parts of this polymer solution are mixed with 50 parts of a polypropylene glycol having a molecular weight of 2000 and a hydroxyl number of 56 and 100 parts of a polyaddition product of propylene oxide to glycerin having a molecular weight of 2500 and a hydroxyl number of 46 and freed from solvent in vacuo at 125° to 135° C.

To prepare an expanded material, 100 parts of this mixture, 50 parts of the propylene glycol having the hydroxyl number 56, 50 parts of the glycerin-propylene oxide polyaddition product having the hydroxyl number 46, 2 parts of a water-soluble adduct of propylene oxide to dimethylsiloxane and 6 parts of water are mixed together. Then 76.5 parts of a mixture of 2,4- and 2,6-toluylene diisocyanate are added with intense stirring. The mixture foams up rapidly and is cured after about ten minutes. The density of the expanded material is 0.04 g./cc.

EXAMPLE 14

200 parts of styrene, 620 parts of 2-ethylhexyl acrylate, 150 parts of 4-hydroxybutyl acrylate, 30 parts of N-vinyl-2-methylimidazole and 20 parts of hexene-(3)-diol-2,5 are dissolved in 1000 parts of benzene. The solution is heated under nitrogen for five hours at 60° to 75° C. in the presence of 2.0 parts of azodiisobutyronitrile. Then another 1.0 part of azodiisobutyronitrile is added and heating continued for another two hours at 75° to 90° C. A 48.5% polymer solution is obtained. The copolymer has a K-value of 44 (measured in a 2% dimethylformamide solution) and a hydroxyl number of 49.

200 parts of the polymer solution are mixed with 100 parts of a polypropylene glycol having a hydroxyl number of 56 and 100 parts of a trimethylolpropanepropylene oxide polyaddition product having a hydroxyl number of 7 and freed from solvent in vacuo at 130° to 140° C.

200 parts of this solvent-free mixture are mixed thoroughly with another 100 parts of the trimethylolpropylene oxide polyaddition product having the hydroxyl number 57 and 3 parts of a water-soluble adduct of propylene oxide to dimethylsiloxane and 9 parts of water. 105 parts of a mixture of 2,4- and 2,6-toluylene diisocyanate are then added with good stirring. The mixture foams up at once and is cured after about twelve minutes. The expanded material is very elastic; it has a density of 0.039 g./cc.

EXAMPLE 15

380 parts of butyl acrylate, 50 parts of vinylidene chloride, 50 parts of 2-hydroxypropyl acrylate and 20 parts of N-vinylimidazole are dissolved with 17.5 parts of butene-2-ol-(1) in 500 parts of benzene and heated for four hours under nitrogen at 60° to 75° C. in the presence of 1.0 part of azodiisobutyronitrile. Then another 1.0 part of azodiisobutyronitrile is added and heating is continued for another three hours at 75° to 90° C. A 50% polymer solution is obtained having a K-value of 42 (measured in 2% dimethylformamide solution) and a hydroxyl number of 39.

200 parts of this polymer solution are mixed with 100 parts of a polypropylene oxide glycol having a hydroxyl number of 56 and 100 parts of a glycerin-propylene oxide polyaddition product having a hydroxyl number of 56 and freed from solvent in vacuo at 130° to 140° C.

100 parts of this solvent-free mixture are mixed with another 50 parts of the glycerin-propylene oxide polyaddition product having the hydroxyl number 56, 1.5 parts of a water-soluble adduct of propylene oxide to dimethylsiloxane and 4.2 parts of water. While stirring intensely, 62 parts of a mixture of 2,4- and 2,6-toluylene diisocyanate are then added. The mixture foams up and is cured after six minutes. The expanded material is elastic; it has a density of 0.043 g./cc.

EXAMPLE 16

50 parts of a copolymer (the production of which is described in Example 6) is mixed with 10 parts of a polyester from adipic acid, phthalic acid and ethylene glycol having a molecular weight of 1000, 2.5 parts of water and 143 parts of a crude diphenylmethane-4,4'-diisocyanate (NCO-content 29%). The mixture begins to foam up after five seconds. The expansion process is over after one minute.

EXAMPLE 17

925 parts of isobutyl acrylate, 75 parts of di-(β-hydroxyethyl)-aminomethylenemethacrylamide and 30 parts of butene-2-ol-(1) are polymerized with 2 parts of azodiisobutyronitrile in 1000 parts of benzene for eight hours at 70° to 80° C.

100 parts of the copolymer solution is mixed with 150 parts of a reaction product (obtained by adding on propylene oxide to neopentyl glycol (molecular weight 3500) and then reacting the product with such an amount of ethylene oxide that 5 moles of ethylene oxide add on to each of the hydroxyl groups present) having a hydroxyl number of 40 and the mixture is freed from solvent in vacuo. Then 5 parts of water is first added followed by 2 parts of an adduct of propylene oxide to dimethylsiloxane and then 61 parts of a polyphenylpolymethylene isocyanate (NCO-content 30%). The mixture foams up and a porous expanded material is formed.

EXAMPLE 18

100 parts of a copolymer solution prepared as described in Example 11 is mixed with 150 parts of a polyaddition product of propylene oxide to pentaerythritol having a hydroxyl number of 325 and the mixture is freed from solvent in vacuo. 4.5 parts of water is first added and then 215 parts of a crude di-p-xylylenemethane diisocyanate. The mixture foams up and a porous expanded material is formed.

EXAMPLE 19

50 parts of butanediol monoacrylate, 20 parts of N-vinylimidazole and 430 parts of butyl acrylate are dissolved with 15 parts of secondary butenol in 500 parts of benzene and heated under nitrogen in the presence of 0.5 part of azodiisobutyronitrile for four hours at 70° to 75° C. Then another 0.5 part of azodiisobutyronitrile is added and heating is continued for another four hours at 70° to 75° C. An about 50% polymer solution is obtained. The polymer has a K-value of 39.0 (measured in a 2% dimethylformamide solution) and the hydroxyl number 34.

100 parts of this polymer solution is mixed with 200 parts of a reaction product of pentaerythritol with propylene oxide having a hydroxyl number of 325 and freed from solvent in vacuo at 130° C.

To prepare an expanded material, 100 parts of this mixture is thoroughly mixed with 2.5 parts of water, 0.5 part of a water-soluble silicone oil and 0.25 part of stannous octoate. Then 110 parts of a crude diphenylmethane diisocyanate is added while stirring. The mixture foams up in a few seconds. A hard expanded material having a density of 0.035 g./cc. is obtained which is almost compression-proof but not brittle.

EXAMPLE 20

The polymer having a K-value of 39.0 and a hydroxyl number of 34 prepared according to Example 19 is used. 100 parts of the polymer solution is mixed with 125 parts of a reaction product of pentaerythritol with propylene oxide having the hydroxyl number 325 and 75 parts of N,N,N',N'-tetrakis-(2-hydroxypropyl)-ethylene diamine and freed from solvent in vacuo at 140° C.

25 parts of monofluorotrichloromethane, 0.2 part of stannous octoate and 0.5 part of a water-soluble silicone oil are stirred into 100 parts of this mixture and while stirring intensely 107 parts of a crude diphenylmethane diisocyanate is introduced. The mixture foams up in a few seconds and is cured after five minutes. The expanded material is hard but not brittle and has a density of 0.030 g./cc.

We claim:

1. In a process for the production of polyurethane foams by reacting an organic aromatic polyisocyanate and a hydroxyl containing compound selected from the group consisting of polyesters and polyethers in the presence of a compound selected from the group consisting of (1) water and (2) a readily volatile organic compound which is inert to isocyanates and whose boiling point is between 0° C. and 100° C., the improvement which comprises: carrying out the reaction in the presence of at least one copolymer containing (1) a group selected from the group consisting of hydroxyl, carboxyl, and carboxylic amide and (2) tertiary nitrogen atoms; said copolymer having been obtained from the copolymerization of monomeric polymerizable alpha-beta-ethylenically unsaturated monomers; the amount of said copolymer comprising from 5 to 75% by weight of the total initial reaction mixture.

2. The process of claim 1 wherein the copolymer comprises a polymer resulting from the copolymerization of (1) an alpha,beta-ethylenically unsaturated monomer containing (A) a group selected from the group consisting of hydroxyl, carboxyl, and carboxylic amide and (B) a tertiary nitrogen atom and (2) at least one other alpha, beta-ethylenically unsaturated polymerizable monomer.

3. The process of claim 2 wherein the copolymer comprises a polymer resulting from the copolymerization of an alpha,beta-ethylenically unsaturated monomer containing a hydroxyl group and a tertiary nitrogen atom and at least one other alpha,beta-ethylenically unsaturated monomer.

4. In the process of claim 1 the improvement which comprises: carrying out the reaction in the presence of at least one copolymer containing hydroxyl groups and tertiary nitrogen atoms, said copolymer having been obtained by copolymerization of monomeric polymerizable alpha,beta-ethylenically unsaturated monomers, the amount of said copolymer comprising from 5 to 75% by weight of the total initial reaction mixture.

5. A process as claimed in claim 4 wherein the polyisocyanate is an aromatic diisocyanate.

6. A process as claimed in claim 4 carried out in the presence of 0.5 to 10% by weight of water.

7. A process as claimed in claim 4 wherein the reaction is carried out in the presence of 1 to 50% by weight of readily volatile organic compounds which are inert to isocyanate and whose boiling point is between 0° and 100° C.

References Cited by the Examiner

UNITED STATES PATENTS

| | | | |
|---|---|---|---|
| 2,879,178 | 3/1959 | McWherter et al. | 260—77.5 |
| 2,884,336 | 4/1959 | Loshaek et al. | 117—11 |
| 3,028,367 | 3/1962 | O'Brien | 260—77.5 |
| 3,105,063 | 9/1963 | Damusis | 260—77.5 |
| 3,137,662 | 6/1964 | Recktenwald | 260—2.5 |

FOREIGN PATENTS 625,351   3/1963   Belgium.

LEON J. BERCOVITZ, *Primary Examiner.*

DONALD E. CZAJA, *Examiner.*

F. McKELVEY, *Assistant Examiner.*